United States Patent [19]

Puhl et al.

[11] Patent Number: 5,564,106
[45] Date of Patent: Oct. 8, 1996

[54] METHOD FOR PROVIDING BLIND ACCESS TO AN ENCRYPTION KEY

[75] Inventors: Larry C. Puhl, Sleepy Hollow; Louis D. Finkelstein, Wheeling; Ezzat A. Dabbish, Cary, all of Ill.

[73] Assignee: Motorola, Inc., Schaumburg, Ill.

[21] Appl. No.: 401,592

[22] Filed: Mar. 9, 1995

[51] Int. Cl.$^6$ .................................................... H04L 1/00
[52] U.S. Cl. ............................................. 380/21; 380/45
[58] Field of Search ................................... 380/21, 45, 9, 380/49

[56] References Cited

U.S. PATENT DOCUMENTS 4,405,829  9/1983  Rivest et al. .......................... 178/22.1

OTHER PUBLICATIONS

J. L. Massey, "Contemporary Cryptology: An Introduction," in Contemporary Cryptology: The Science of Information Integrity, G. J. Simmons, ed., IEEE Press, 1992, pp. 32–35.

Bruce Schneir, "Applied Cryptography: Protocols, Algorithms, and Source Code in C", 2nd edition John Wiley and Sons, N.Y. pp. 516–517 Section 22.3.

Primary Examiner—Thomas H. Tarcza
Assistant Examiner—Pinchus M. Laufer
Attorney, Agent, or Firm—Darleen J. Stockley

[57] ABSTRACT

Blind access (100, 300, 400) to a desired encryption key of a predetermined first group member is provided to a second group. The first group encrypts a plurality of first group member encryption keys using a predetermined algorithm and transfers to the second group, the encrypted plurality of first group member encryption keys with corresponding unencrypted first group member identification fields, IDs, and a list of IDs corresponding to the first group members. The desired ID-free encryption key is selected and encrypted by the second group using a predetermined algorithm. The doubly encrypted key is transferred to the first group, decrypted by the first group and transferred to the second group for decryption. Thus, the encryption key is provided without knowledge to the first group of which member's encryption key is being examined and with knowledge to the second group of only the desired encryption key.

13 Claims, 3 Drawing Sheets

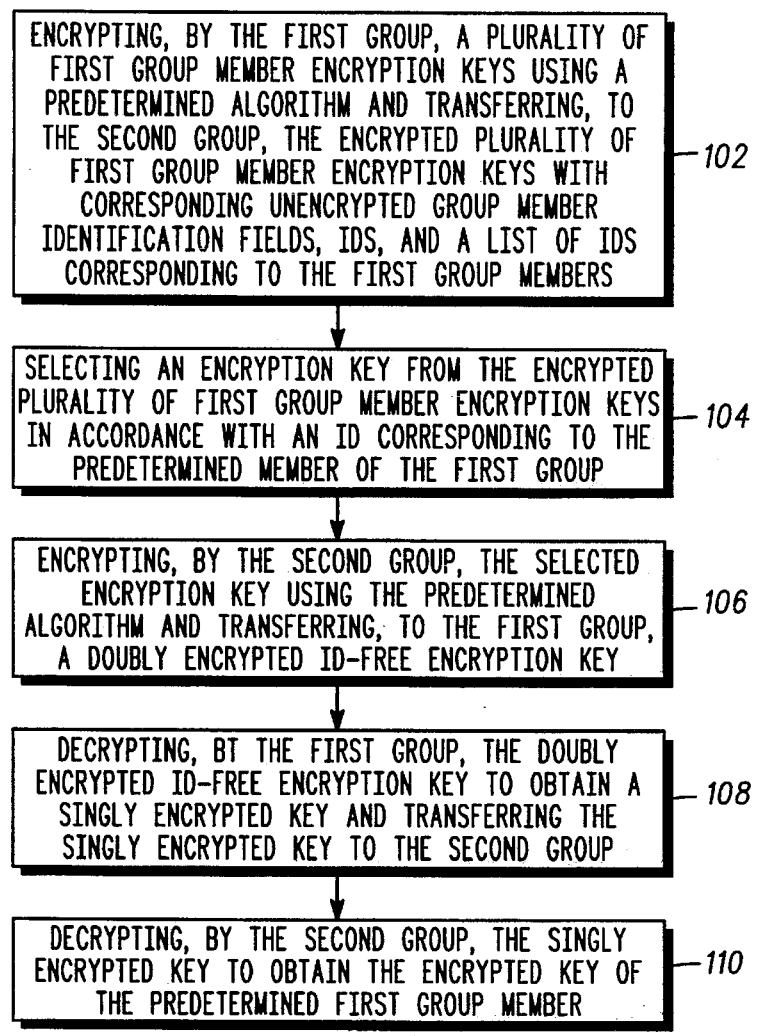
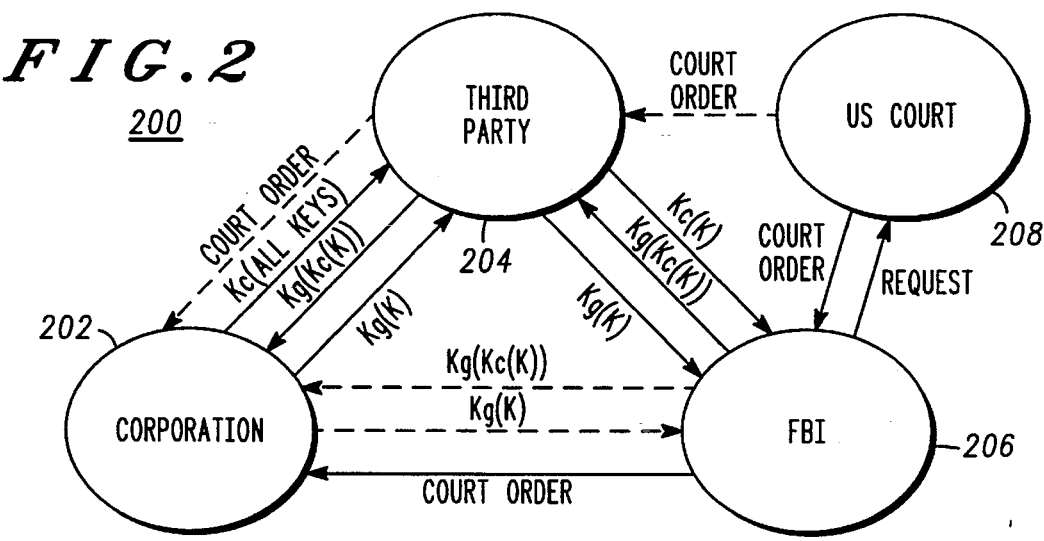

300

400

METHOD FOR PROVIDING BLIND ACCESS TO AN ENCRYPTION KEY

FIELD OF THE INVENTION

The present invention relates to accessing encryption keys, and more particularly, to blind access to encryption keys.

BACKGROUND

Private businesses and government agencies may need to access encryption keys used by industry employees without it being apparent whose encyrption key is being accessed. The private businesses may need to access individual keys in order to replace lost tokens and to provide access to management. Government agencies generally need to access keys for court-authorized law enforcement purposes. Clearly, private businesses typically will need to access encryption keys more often than government agencies. Thus, it is more efficient for a private business to maintain encryption keys for its employees and to allow for occasional access by governmental agencies when such access is authorized by the courts.

However, when a governmental agency accesses encryption keys of an individual, it typically does not want the private business to know which employee is under surveillance. Thus, there is a need for a method for providing, by a particular private business, to an authorized governmental agency, an encryption key of an employee under surveillance without identifying which employee is being examined.

More generally, there is a need for providing, to a second group, blind access to an encryption key of a predetermined first group member.

BRIEF DESCRIPTIONS OF THE DRAWINGS

FIG. 1 is a flow chart of one embodiment of steps in accordance with the method of the present invention.

FIG. 2 is a schematic representation of the flow of information in one embodiment of the present invention in which third party verification is utilized.

DETAILED DESCRIPTION OF A PREFERRED EMBODIMENT

Figure 3:
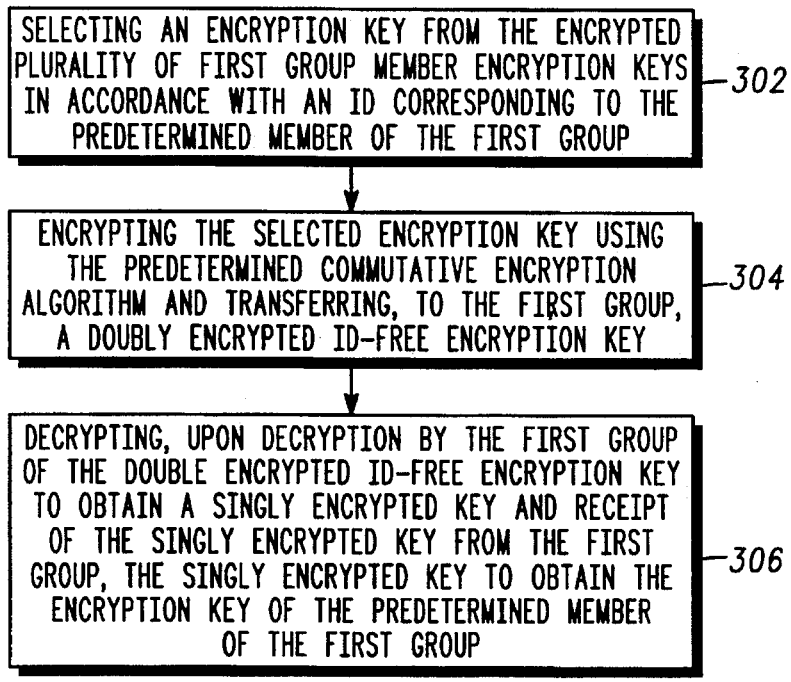
FIG. 3 is a flow chart of an embodiment of steps implemented by a second group receiving blind access to an encryption key of a member of a first group in accordance with the method of the present invention.

The method of the present invention method provides, to a second group, blind access to an encryption key of a predetermined first group member. This is particularly useful, for example, for provision by a particular private business to an authorized governmental agency, of a set of encryption keys that includes the encryption key of an employee under surveillance so that the governmental agency may obtain access to an encryption key of a particular employee of the business without identifying which employee is being examined, and, in addition, such that the governmental agency only receives access to the particular encryption key of the employee under surveillance. Further, the method may be implemented such that it includes independent verification that ensures that the governmental agency only has access to the encryption key that matches a court order.

FIG. 1, numeral 100, is a flow chart of one embodiment of steps in accordance with the method of the present invention. The method provides, to a second group, blind access to an encryption key of a predetermined first group member by: (1) encrypting (102), by the first group, a plurality of first group member encryption keys using a predetermined algorithm and transferring, to the second group, the encrypted plurality of first group member encryption keys with corresponding unencrypted first group member identification fields, IDs, and a list of IDs corresponding to the first group members; (2) selecting (104) an encryption key from the encrypted plurality of first group member encryption keys in accordance with an ID corresponding to the predetermined member of the first group; (3) encrypting (106), by the second group, the selected encryption key using the predetermined algorithm and transferring, to the first group, a doubly encrypted ID-free encryption key; (4) decrypting (108), by the first group, the doubly encrypted ID-free encryption key to obtain a singly encrypted key and transferring the singly encrypted key to the second group; and (5) decrypting (110), by the second group, the singly encrypted key to obtain the encryption key of the predetermined first group member.

In one implementation, the first group may be a business, the second group may be a governmental agency, and the predetermined member of the first group is an employee of the business that is specified in an order of a court of law.

Where third party verification is not utilized for determining that the second party has access only to a specific key, the transferring of step 1 above is from the first group to the second group.

Where third party verification is utilized for determining that the second party has access only to a specific key, the transferring of step 1 above includes (A) transferring to a third group, by the first group, of the encrypted plurality of first group member encryption keys with corresponding unencrypted identification codes, IDs, and a list of IDs corresponding to the first group members; and (B) selecting in step 2 includes selecting by the third group and transferring by the third group to the second group, an encrypted encryption key from the encrypted plurality of first group member encryption keys in accordance with an ID corresponding to the predetermined member of the first group.

Typically, communication and data files are generated by the first group members and at least one of the communication and data files have a corporate identity field that is utilized by the second group to determine files generated by the first group.

The predetermined algorithm is a commutative encryption algorithm. A commutative encryption algorithm has the property that a doubly encrypted message that has been encrypted using, for example, for any selected two keys $K_A$ and $K_B$, the doubly encrypted message may be decrypted by using $K_A$ then $K_B$ or by using $K_B$ then $K_A$. Public key encryption algorithms based on exponentiation have this property since:

$$X^{AB} \bmod n = X^{BA} \bmod n.$$

RSA Public Key encryption is a specific example, as cited in U.S. Pat. No. 4,405,829, Sep. 20, 1983 (Cryptographic Communications Systems and Method). When using RSA Public Key encryption to encrypt a message m and encode keys A and B, decode keys C and D respectively, and modulus n, where n is a preselected integer, the enciphered form $\underline{c}$ of text obtained for m is of a form:

$$\underline{c}=(m^A \bmod n)^B \bmod n$$

may be decoded by $$m=(\underline{c}^C \bmod n)^D \bmod n$$

or by $$m=(\underline{c}^D \bmod n)^C \bmod n$$

FIG. 2, numeral 200, is a schematic representation of the flow of information in one embodiment of the present invention in which third party verification is utilized. In this example, a corporation (202) utilizes its security department to maintain a backup list of encryption keys ($K_c$, all keys) for each employee of the corporation. The list contains an identity (ID) and the associated encryption key for each employee. Generally, each communication and data file that the employee generates contains a corporate identity field to identify the corporation. Where a governmental agency has received an order of a court (U.S. Court, 208) to examine the communication and data files of a particular employee of the corporation, the government agency approaches the identified corporation to obtain the encryption key. Alternatively, the governmental agency may approach a verification center or government oversight committee which then approaches the corporation to obtain the encryption key. The corporate identity field may be used by the governmental agency to identify where the keys for an intercepted message have been stored. This access is done blindly so that the corporation does not know which individual is being investigated and so that the governmental agency may only obtain one encryption key as authorized by the court order.

The typical protocol is as follows: (1) the corporation encrypts its employee keys using a commutative encryption algorithm and the ID associated with each key is not encrypted; (2) the encrypted list of employee keys is provided to the governmental agency and the governmental agency selects the employee that matches the court order based on the ID; (3) the governmental agency encrypts the selected employee key using the same commutative encryption algorithm and this doubly encrypted employee key is given back to the corporation without the corresponding ID; (4) the corporation decrypts the doubly encrypted message obtaining a singly encrypted employee key that is only encrypted under the government's key, and the key is then given back to the governmental agency; (5) the government decrypts the singly encrypted employee key to obtain the employee key.

Thus, all the keys made available to the government are encrypted except for the selected key. Therefore, the governmental agency only has access to one key. The single key that the corporation decodes has been encrypted by the governmental agency so the corporation does not know which key has been selected by the governmental agency.

Verification that the governmental agency only has access to the key that matches the court order can be accomplished by using a third party (204) to transfer the selected key to the governmental agency (FBI, 206). The corporation provides the encrypted list ($K_c$(all keys)) of employee keys to the third party. The third party selects the encrypted key that matches the court order and provides only this encrypted key ($K_c(K)$) to the governmental agency. The governmental agency encrypts this key and gives it ($Kg(Kc(K))$) back to the corporation, either directly, or via the third party. The corporation (202) decrypts the doubly encrypted key ($Kg(Kc(K))$) to provide a singly encrypted key ($K_g(K)$) and sends the singly encrypted key ($K_g(K)$) either directly to the governmental agency or via the third party. Using this procedure the governmental agency only has access to the authorized key and the third party does not have access to the unencrypted keys.

Figure 5:
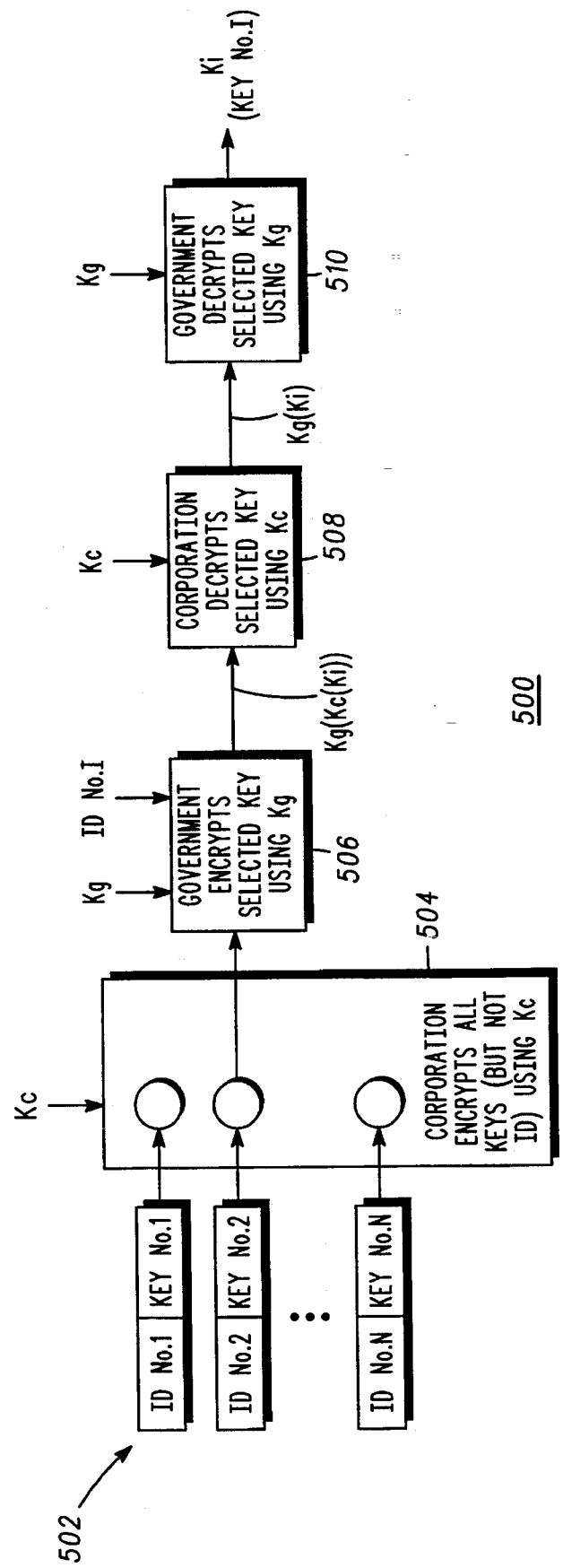
FIG. 5 is a block diagram showing the flow of encryption key information as it is encrypted in accordance with the present invention.

FIG. 3, numeral 300, is a flow chart of an embodiment of steps implemented by a second group receiving blind access to an encryption key of a member of a first group in accordance with the method of the present invention. FIG. 5, numeral 500, is a block diagram showing the flow of encryption key information as it is encrypted in accordance with the present invention. The method provides blind access wherein decrypting is implemented by a second group, of an encryption key of a predetermined member of a first group, utilizing an encrypted plurality ($K_c$, 504) of first group member encryption keys, received from the first group, that has been encrypted using a predetermined commutative encryption algorithm and a list of IDs corresponding to first group members, wherein the first group member encryption keys Key #i or Ki, i a whole number, have corresponding unencrypted first group member identification fields (502), IDs, comprising, by the second group. The steps implemented by the second group include: (1) selecting (302) an encryption key from the encrypted plurality of first group member encryption keys in accordance with an ID corresponding to the predetermined member of the first group; (2) encrypting (304; $K_g$, 506) the selected encryption key using the predetermined commutative encryption algorithm and transferring, to the first group, a doubly encrypted ID-free encryption key; and (3) decrypting (306; $K_g$, 510), upon decryption ($K_c$, 508) by the first group of the doubly encrypted ID-free encryption key to obtain a singly encrypted key and receipt of the singly encrypted key from the first group, the singly encrypted key to obtain the encryption key of the predetermined member of the first group.

Again, typically, the predetermined member of the first group is specified in an order of a court of law. Also, again, at least one of communication and data files are generated by first group members and the communication and data files have a corporate identity field that may be utilized by the second group to determine files generated by the first group.

Figure 4:
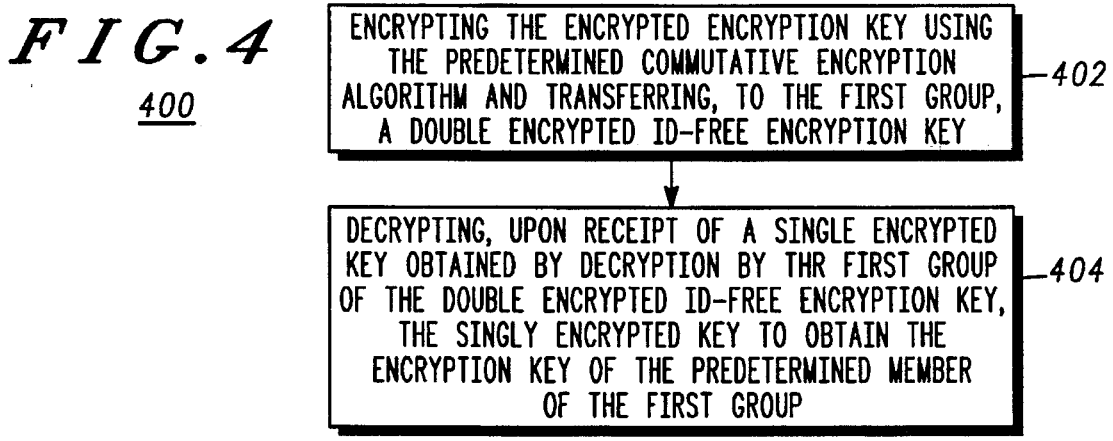
FIG. 4 is a flow chart of an embodiment of steps implemented by a second group receiving blind access to an encryption key of a member of a first group in accordance with the method of the present invention wherein third party verification is utilized.

FIG. 4, numeral 400, is a flow chart of an embodiment of steps implemented by a second group receiving blind access to an encryption key of a member of a first group in accordance with the method of the present invention wherein third party verification is utilized. The method provides blind access wherein decrypting is implemented by a second group, of an encryption key of a predetermined member of a first group, utilizing an encrypted encryption key obtained by a third group from an encrypted plurality of first group member encryption keys provided to the third group by the first group, wherein the encrypted plurality of first group member encryption keys has been encrypted using a predetermined commutative encryption algorithm and the third group has preselected the encrypted encryption key as the encrypted encryption key of the predetermined member of the first group based on a list of first group member unencrypted identification fields, IDs, corresponding to first group members. The steps implemented by the second group include: (1) encrypting (402) the encrypted encryption key using the predetermined commutative encryption algorithm and transferring, to the first group, a doubly encrypted ID-free encryption key; and (2) decrypting (404), upon receipt of a singly encrypted key obtained by decryption by the first group of the doubly encrypted ID-free encryption key, the singly encrypted key to obtain the encryption key of the predetermined member of the first group.

The predetermined member of the first group may be specified as described above. Also, the communication and data files may be utilized as described above.

Although exemplary embodiments are described above, it will be obvious to those skilled in the art that many alterations and modifications may be made without departing from the invention. Accordingly, it is intended that all such alterations and modifications be included within the spirit and scope of the invention as defined in the appended claims.

We claim:

1. A method for providing, to a second group, blind access to an encryption key of a predetermined first group member, comprising the steps of:

1A) encrypting, by the first group, a plurality of first group member encryption keys using a predetermined algorithm and transferring, to the second group, the encrypted plurality of first group member encryption keys with corresponding unencrypted first group member identification fields, IDs, and a list of IDs corresponding to the first group members;

1B) selecting an encryption key from the encrypted plurality of first group member encryption keys in accordance with an ID corresponding to the predetermined member of the first group;

1C) encrypting, by the second group, the selected encryption key using the predetermined algorithm and transferring, to the first group, a doubly encrypted ID-free encryption key;

1D) decrypting, by the first group, the doubly encrypted ID-free encryption key to obtain a singly encrypted key and transferring the singly encrypted key to the second group; and 1E) decrypting, by the second group, the singly encrypted key to obtain the encryption key of the predetermined first group member.

2. The method of claim 1 wherein the predetermined member of the first group is specified in an order of a court of law.

3. The method of claim 1 wherein the predetermined algorithm is a commutative encryption algorithm.

4. The method of claim 1 wherein the transferring of step 1A is directly from the first group to the second group.

5. The method of claim 1 wherein:

5A) the transferring of step 1A includes transferring to a third group, by the first group, of the encrypted plurality of first group member encryption keys with corresponding unencrypted identification codes, IDs, and a list of IDs corresponding to the first group members; and 5B) the step of selecting of step 1B includes selecting by the third group and transferring by the third group to the second group, an encryption key from the encrypted plurality of first group member encryption keys in accordance with an ID corresponding to the predetermined member of the first group.

6. The method of claim 5 wherein the third group is a verification center/government oversight committee.

7. The method of claim 1 wherein at least one of communication and data files are generated by the first group members and at least one of the communication and data files have a corporate identity field that is utilized by the second group to determine files generated by the first group.

8. A method for blind access decrypting, by a second group, of an encryption key of a predetermined member of a first group, utilizing an encrypted plurality of first group member encryption keys, received from the first group, that has been encrypted using a predetermined commutative encryption algorithm and a list of IDs corresponding to first group members, wherein the first group member encryption keys have corresponding unencrypted first group member identification fields, IDs, comprising, by the second group, the steps of:

8A) selecting an encryption key from the encrypted plurality of first group member encryption keys in accordance with an ID corresponding to the predetermined member of the first group;

8B) encrypting the selected encryption key using the predetermined commutative encryption algorithm and transferring, to the first group, a doubly encrypted ID-free encryption key; and 8C) decrypting, upon decryption by the first group of the doubly encrypted ID-free encryption key to obtain a singly encrypted key and receipt of the singly encrypted key from the first group, the singly encrypted key to obtain the encryption key of the predetermined member of the first group.

9. The method of claim 8 wherein the predetermined member of the first group is specified in an order of a court of law.

10. The method of claim 8 wherein at least one of: communication and data files are generated by first group members and the communication and data files have a corporate identity field that is utilized by the second group to determine files generated by the first group.

11. A method for blind access decrypting, by a second group, of an encryption key of a predetermined member of a first group, utilizing an encrypted encryption key obtained by a third group from an encrypted plurality of first group member encryption keys provided to the third group by the first group, wherein the encrypted plurality of first group member encryption keys has been encrypted using a predetermined commutative encryption algorithm and the third group has preselected the encrypted encryption key as the encrypted encryption key of the predetermined member of the first group based on a list of first group member unencrypted identification fields, IDs, corresponding to first group members, comprising, for the second group, the steps of:

11A) encrypting the encrypted encryption key using the predetermined commutative encryption algorithm and transferring, to the first group, a doubly encrypted ID-free encryption key;

11B) decrypting, upon receipt of a singly encrypted key obtained by decryption by the first group of the doubly encrypted ID-free encryption key, the singly encrypted key to obtain the encryption key of the predetermined member of the first group.

12. The method of claim 11 wherein the predetermined member of the first group is specified in an order of a court of law.

13. The method of claim 11 wherein at least one of: communication and data files are generated by first group members and the communication and data files have a corporate identity field that is utilized by the second group to determine files generated by the first group.

* * * * *